(12) United States Patent
Audoin

(10) Patent No.: US 7,299,689 B2
(45) Date of Patent: Nov. 27, 2007

(54) PROCESS AND DEVICE FOR DETERMINING THE INTERNAL TEMPERATURE OF A CATALYTIC CONVERTER OF A VEHICLE EQUIPPED WITH A HEAT ENGINE

(75) Inventor: Arnaud Audoin, Paris (FR)

(73) Assignee: Peugeot Citroën Automobiles SA, Villacoublay (FR)

( * ) Notice: Subject to any disclaimer, the term of this patent is extended or adjusted under 35 U.S.C. 154(b) by 0 days.

(21) Appl. No.: 10/946,698

(22) Filed: Sep. 22, 2004

(65) Prior Publication Data

US 2005/0076710 A1    Apr. 14, 2005

(30) Foreign Application Priority Data

Sep. 23, 2003    (FR) .................................. 03 50595

(51) Int. Cl.
*G01M 19/00* (2006.01)
(52) U.S. Cl. .................................................... 73/118.1
(58) Field of Classification Search ............... 73/118.1, 73/116, 117.3; 60/274; 701/109; 123/676, 123/339.12, 277
See application file for complete search history.

(56) References Cited

U.S. PATENT DOCUMENTS

| | | | | |
|---|---|---|---|---|
| 5,158,063 A * | 10/1992 | Hosoda et al. | ............... | 123/676 |
| 5,291,673 A * | 3/1994 | Hamburg et al. | ............... | 60/274 |
| 5,414,994 A * | 5/1995 | Cullen et al. | ................ | 60/274 |
| 5,428,956 A * | 7/1995 | Maus et al. | .................. | 60/277 |
| 5,630,315 A * | 5/1997 | Theis | ........................ | 60/274 |
| 5,751,602 A * | 5/1998 | Maus et al. | ................ | 701/103 |
| 5,815,828 A * | 9/1998 | Nankee et al. | ............. | 701/109 |
| 5,862,661 A * | 1/1999 | Zhang et al. | ................ | 60/274 |
| 5,956,941 A * | 9/1999 | Cullen et al. | ................ | 60/274 |
| 6,161,428 A * | 12/2000 | Esteghlal et al. | ........... | 73/118.1 |
| 6,389,805 B1 * | 5/2002 | Poggio et al. | .............. | 60/277 |
| 6,571,602 B2 * | 6/2003 | Ohkuma | .................... | 73/23.32 |
| 6,651,422 B1 * | 11/2003 | LeGare | ...................... | 60/277 |
| 6,823,839 B2 * | 11/2004 | Yasui et al. | .......... | 123/339.12 |
| 6,957,527 B2 * | 10/2005 | Ueda et al. | ................. | 60/274 |

FOREIGN PATENT DOCUMENTS

| | | |
|---|---|---|
| DE | 101 08 182 A | 10/1992 |
| DE | 198 36 955 A | 3/2000 |
| DE | 199 07 382 A | 8/2000 |
| DE | 199 61 164 A | 6/2001 |
| EP | 1 061 241 A | 12/2000 |
| FR | 2 834 752 A | 7/2003 |

* cited by examiner

*Primary Examiner*—Michael Cygan
*Assistant Examiner*—Octavia Davis
(74) *Attorney, Agent, or Firm*—RatnerPrestia

(57) ABSTRACT

The present invention pertains to a process for determining the internal temperature of a catalytic converter of a vehicle equipped with a heat engine. According to the present invention, such a process is characterized in that this temperature is determined by calculating the mean value of exhaust gas temperature measurements carried out before the admission of these gases into the catalytic converter over a limited period of time, these measurements being weighted by a variable that is a function of the oxidation activity of the catalytic converter.

7 Claims, 2 Drawing Sheets

EXOTHERMIC MODEL    THERMAL INERTIA MODEL

PROCESS AND DEVICE FOR DETERMINING THE INTERNAL TEMPERATURE OF A CATALYTIC CONVERTER OF A VEHICLE EQUIPPED WITH A HEAT ENGINE

FIELD OF THE INVENTION

The present invention pertains to a process and a device for determining the internal temperature of a catalytic converter of a vehicle equipped with a heat engine.

BACKGROUND

The catalytic converter 100 (FIG. 1) is used in a vehicle 102 to improve the quality of the exhaust gases 104 discharged from the engine 106 of the said vehicle.

To achieve this, the said catalytic converter 100 receives the gases 104 discharged by the engine 106 of the vehicle 102 in order to treat them by means, in particular, nitrogen oxide (NOx) traps or particle filters intended to remove the latter.

In certain cases, as is shown in FIG. 1, the said catalytic converter 100 may be located at the outlet of a turbocompressor T with which the said vehicle 102 is equipped if the vehicle is equipped with such a turbocompressor.

However, if such a turbocompressor is not present, the catalytic converter receives the exhaust gases of the engine directly.

Consequently, the exhaust gases 104 are sent to the exhaust pipe 108 of the vehicle 102, from which they can be emitted into the environment with a reduced pollutant level.

It is also known that the operation of a catalytic converter 100 depends on the internal temperature of the said catalytic converter, especially if the latter is used to treat the oxides of nitrogen (NOx).

The efficiency of a catalytic converter is therefore linked with the internal temperature of the catalytic converter and especially of the internal part of the said catalytic converter, which is also called a trap, which is used to interact with the pollutants and to remove them.

However, the determination of the temperature of this material is problematic given that it reaches elevated temperatures making the environment difficult for a probe.

In addition, the installation of a heat probe inside the catalytic converter is complicated and expensive.

The object of the present invention is to provide a process and a device that make it possible to determine the internal temperature of a catalytic converter, solving the above-mentioned problems. It results from the observation that the temperature of a catalytic converter is determined practically by two thermal phenomena, namely, a thermal inertia to heating, i.e., the progressive heating of the catalytic converter, tending toward the temperature of the exhaust gases, due to the fact that the catalytic converter is a solid whose temperature rises under the effect of the exhaust gases passing through it, and an exothermic reaction of the catalytic converter, i.e., the heating of the catalytic converter due to the release of energy produced by the oxidation reactions of particles in the catalytic converter.

This is the case, in particular, when compounds such as carbon monoxides (CO) and hydrocarbons (HC) are oxidized in contact with the catalytic converter.

SUMMARY OF THE INVENTION

This is why the present invention pertains to a process for determining the internal temperature of a catalytic converter of a vehicle equipped with a heat engine, characterized in that this temperature is determined by calculating the mean value of the temperature measurements of the exhaust gases of the said engine, which said measurements are performed before the admission of the said gases into the catalytic converter over a limited period of time, these measurements being weighted by a variable that is a function of the oxidation activity of the catalytic converter.

By taking into account the mean value of the exhaust gas temperature measurements performed before these exhaust gases are admitted into the catalytic converter and over a limited period of time, we simulate the inertia of the temperature rise of the catalytic converter under the effect of these exhaust gases.

In fact, the exhaust gases having an increasing temperature under the effect of the heating of the engine, the mean value of the exhaust gas temperature measurements performed over a limited duration has a value lower than the value of the temperature of the exhaust gases at the inlet into the catalytic converter at the end of this duration.

Thus, the phenomenon of inertia of the catalytic converter is reproduced by means of a simple operation requiring rather inexpensive calculation elements.

By weighting each measurement by a variable that is a function of the oxidation activity of the catalytic converter, the exothermic phenomenon of the catalytic converter is simulated as was described above in just as simple and rather inexpensive a manner.

In addition, the process according to the present invention has the advantage of not requiring a temperature probe inside the catalytic converter, which reduces the complexity and the cost of the device for determining the temperature in the catalytic converter.

In one embodiment, each temperature measurement is weighted by adding to it a variable that is a function of the oxidation activity of the catalytic converter.

According to one embodiment, this variable is determined from the quantity of fuel introduced into the engine.

Thus, this variable can be determined easily because the quantity of fuel introduced into the engine is known exactly, e.g., by means of an electronic processor.

In one embodiment, the variable is determined as a function of three modes of exothermic reaction of the catalytic converter, each mode being peculiar to a range of quantities of fuel injected into the engine.

According to one embodiment, the internal temperature of the catalytic converter is determined by means of a formula such as:

$$T_{in\ cat.\ converter} = \Sigma_{t=1:n}[AT_1(t) + P(Q_{inj}(t))]/n \qquad (1)$$

in which n denotes the number of measurements taken into account, $AT_1(t)$ is an indicator of the exhaust gas temperature at the moment t comprised within the measurement time defined by the number n of measurements and their frequency (for example, 1 Hz), and $P(Q_{inj}(t))$ is a variable added to the measurement $AT_1(t)$ to weight it in agreement with the oxidation activity of the catalytic converter, or with the exothermic phenomenon of the catalytic converter.

Thus, using a simple formula, it is possible to determine the internal temperature of the catalytic converter by simulating the two thermal phenomena, which practically regulate the temperature of the catalytic converter.

In one embodiment, temperature measurements are performed, whose number is on the order of magnitude of 20, the said measurements being carried out at a repetition frequency of, e.g., 1 Hz.

The present invention also pertains to a device for determining the internal temperature of a catalytic converter of a vehicle equipped with a heat engine, such a device being characterized in that it comprises means, such as a processor, for determining this temperature according to one of the embodiments of the present invention.

BRIEF DESCRIPTION OF THE DRAWINGS

Other characteristics and advantages of the present invention will appear from the following description given as an illustrative and nonlimiting description with reference to the figures attached, in which.

DETAILED DESCRIPTION

Figure 1:
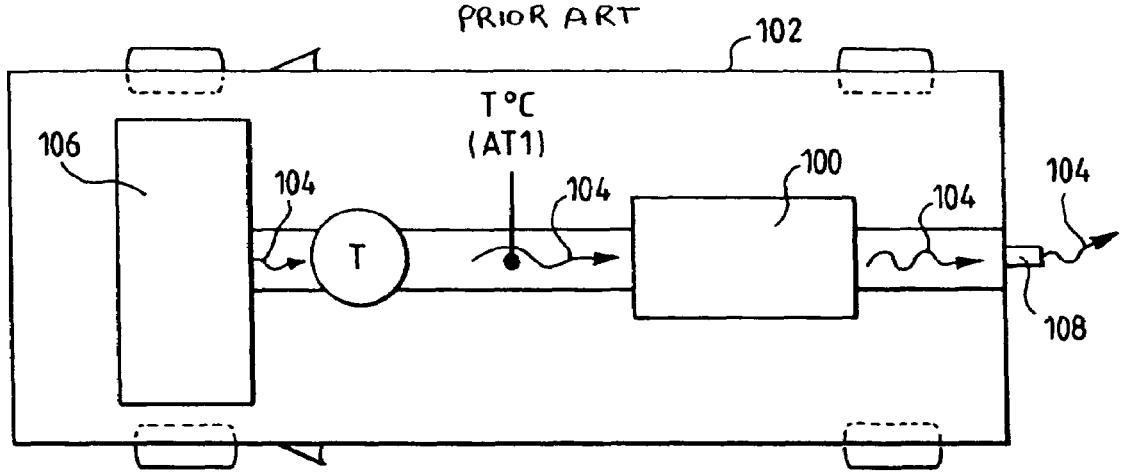
FIG. 1, already described, is a schematic diagram of a vehicle equipped with a heat engine and a catalytic converter for the exhaust gases of the said engine.
Figure 2:
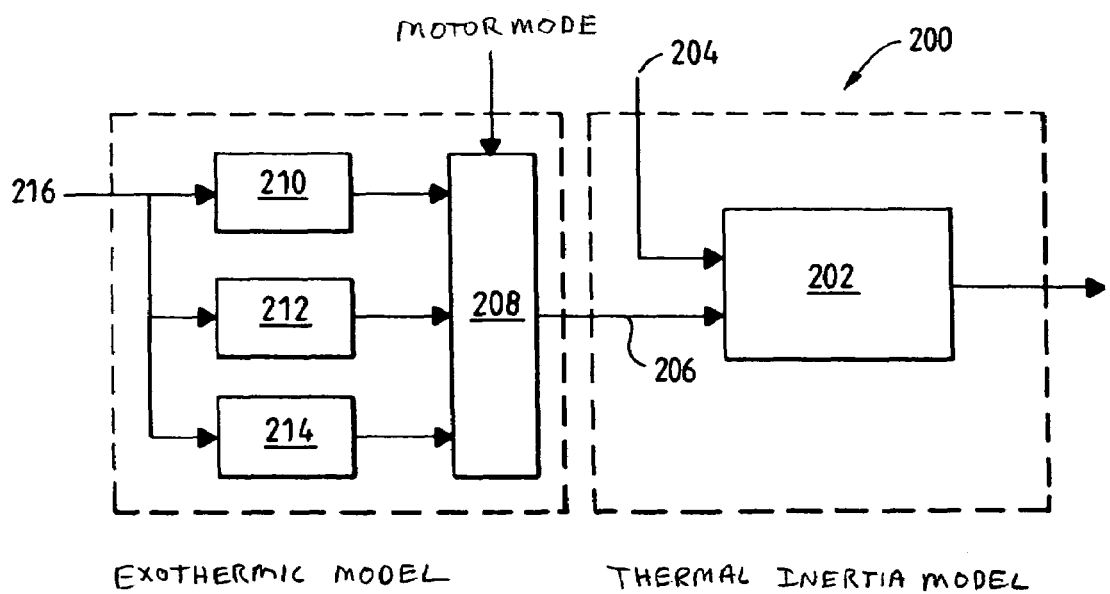
FIG. 2 shows a schematic diagram of the operations performed by a processor according to the present invention.

In the above-described embodiment of the present invention, the process according to the present invention is carried out in a processor 200, which comprises for this purpose the means 202 determining the mean value of the engine exhaust gas temperature measurements 204, these measurements being carried out before the admission of these gases into the catalytic converter over a limited period of time, such that when a new temperature measurement is taken into account, the oldest temperature measurement is not taken into account in the calculation of the mean value any longer.

Thus, taking into account that the temperature of the catalytic converter can be obtained by calculating such a sliding mean value, the phenomenon of thermal inertia of the catalytic converter during the heating of the said catalytic converter by the exhaust gases is simulated.

Thus, the calculation of such a mean value, also called a sliding mean value, causes the catalytic converter temperature determined to be theoretically lower than the last temperature measured when the measured temperatures are rising as a consequence of the progressive heating of the engine.

The fact is now found that the temperature of the catalytic converter is lower in this case, when only the phenomenon of thermal inertia is taken into account, than the temperature of the exhaust gases.

However, it is possible that a decrease in the exhaust gas temperatures causes the temperature in the catalytic converter to be higher than the temperature of the exhaust gases.

In this case, the calculation of a sliding mean value from the exhaust gas temperatures causes the determined temperature of the catalytic converter to be theoretically higher than the last temperature measured when these measured temperatures are declining, which consequently reproduces again the phenomenon of inertia of the catalytic converter.

However, as was described above, the exothermic phenomenon of the catalytic converter, i.e., the heating due to the oxidation reactions, must be taken into account as well.

This is taken into account practically in this embodiment by weighting the temperature measurement by adding a constant 206 in order for the sliding mean value to be calculated in taking into account the temperature measurements thus weighted.

Such a taking into account can be carried out by using a formula such as:

$$T_{in\ cat.\ converter} = \Sigma_{t=1:n}[AT_1(t) + P(Q_{inj}(t))]/n \qquad (1)$$

in which n denotes the number of measurements taken into account, equaling, for example, 20, and $AT_1(t)$ is an exhaust gas temperature measurement at the moment t comprised in the duration of measurements defined by the number n of measurements and their repetition frequency (e.g., 1 Hz).

$P(Q_{inj}(t))$ is also the constant 206 added to the measurement $AT_1(t)$ for weighting in agreement with the exothermic phenomenon of the catalytic converter.

In this preferred embodiment, the constant 206 is determined by taking into account three exothermic modes of the catalytic converter, namely, a lean exothermic reaction, which corresponds to the normal operation of a diesel engine in which an excess amount of oxygen is present in the exhaust gases, a heating exothermic reaction, which corresponds to a mode of operation of the engine that makes it possible to raise the temperature of the exhaust gases, for example, for regenerating a particle filter or for desulfurizing a nitrogen oxide (NOx) trap, and which has a considerable exothermic reaction for a few minutes, and a rich exothermic reaction, which corresponds to a mode of operation of the engine that permits the reduction of the nitrogen oxides (NOx) and which has a very strong exothermic reaction for a few seconds.

In this embodiment, these different exothermic reactions are identified for each of the three modes of operation of the engine mentioned solely as a function of the quantity of fuel 216 introduced into the engine such that a lean exothermic reaction corresponds to a small quantity of fuel introduced, whereas the heating exothermic reaction and then the rich exothermic reaction correspond to increasing quantities of injected fuel.

Thus, the larger the quantity of treated pollutants, the higher is the oxidation activity of the catalytic converter. Now, this quantity increases with increasing quantity of injected fuel.

This is why the processor 200 comprises means 210, 212 and 214 for taking into account a lean exothermic reaction, a heating exothermic reaction or a rich exothermic reaction, respectively, based on the quantity 216 of fuel admitted into the engine.

Figure 3A:
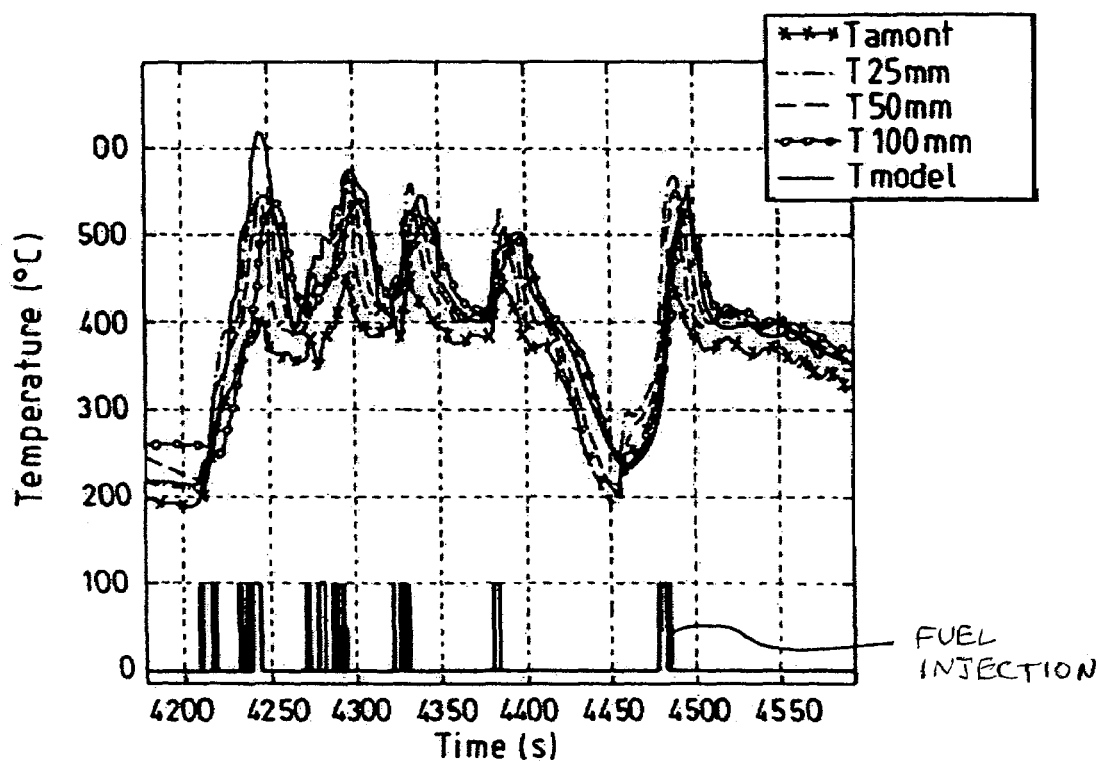
FIGS. 3a and 3b show comparisons of temperatures measured and determined in a catalytic converter according to the present invention.
Figure 3B:
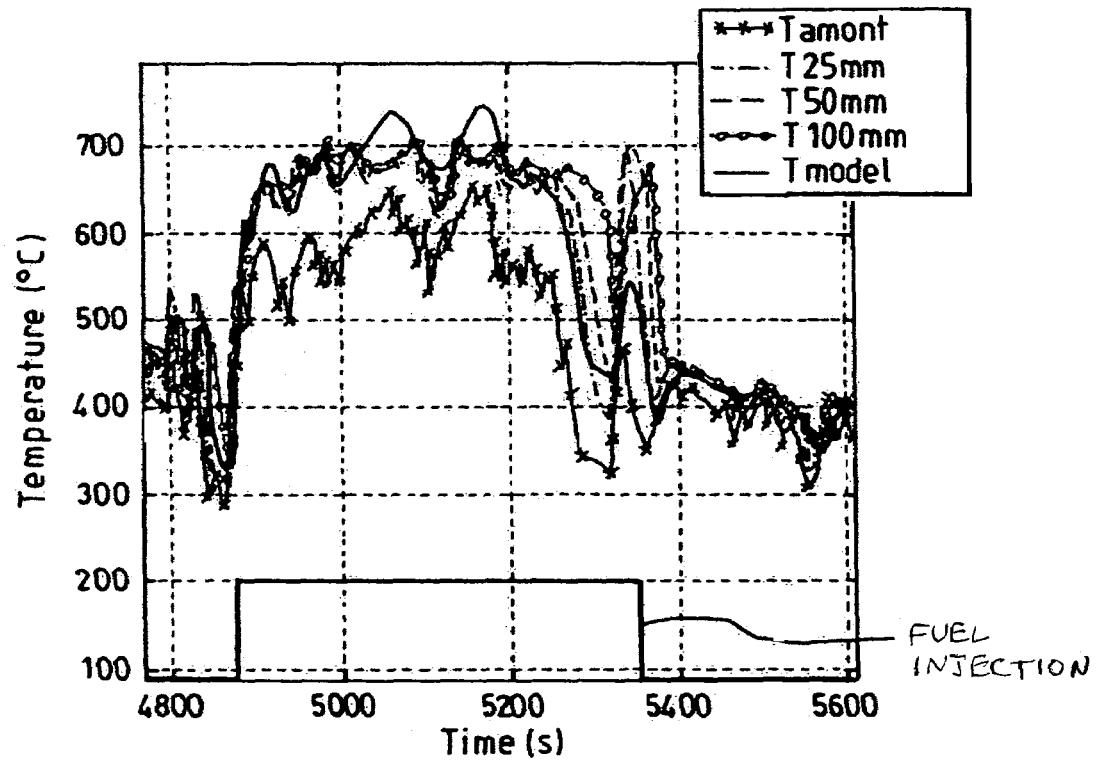

Temperature determinations were performed empirically according to a process according to the present invention for a rich exothermic mode (FIG. 3a) or a heating exothermic mode (FIG. 3b), as is shown in FIGS. 3a and 3b, and compared with measurements carried out by means of thermocouple probes implanted upstream of the catalytic converter (Tamon) and than in the said catalytic converter at variable flow distance of the gas in the said catalytic converter, namely, at 25 mm (T25 mm), at 50 mm (T50 mm) and at 100 mm (T100 mm), with the total length of the catalytic converter equaling 150 mm.

These figures make it possible to verify that the temperature determinations Tmodel according to a process according to the present invention satisfactorily correspond to the temperature in the catalytic converter.

The invention claimed is:

1. A process for determining the temperature of a catalytic converter of a vehicle equipped with a heat engine, comprising the steps of:
   calculating a mean value of exhaust gas temperature measurements carried out before the admission of these gases into the catalytic converter over a limited period of time, these measurements being weighted by a variable that is a function of oxidation activity of the said catalytic converter,
   this temperature being determined without measuring any temperature inside the catalytic converter or downstream of any catalytic converter, and
   outputting the mean value of exhaust gas temperature measurements to evaluate the efficiency of the catalytic converter.

2. The process in accordance with claim 1, wherein each temperature measurement is weighted by adding to it the variable that is the function of the oxidation activity of the said catalytic converter.

3. The process in accordance with claim 2, wherein the said variable is determined from the quantity of fuel introduced into the engine.

4. The process in accordance with one of the claims 2 or 3, wherein the variable is determined as a function of three modes of exothermic reaction of the catalytic converter, each mode being peculiar to a range of quantities of fuel injected into the engine.

5. A process for determining the internal temperature of a catalytic converter of a vehicle equipped with a heat engine comprising the steps of:
   calculating a mean value of exhaust gas temperature measurements carried out before the admission of these gases into the catalytic converter over a limited period of time, these measurements being weighted by a variable that is a function of oxidation activity of the said catalytic converter, wherein the internal temperature of the said catalytic converter is determined by means of a formula:

$$T_{in\ cat.\ converter} = \Sigma_{t=1:n}[AT_1(t)+P(Q_{inj}(t))]/n \tag{1}$$

in which n denotes a number of measurements taken into account, $AT_1(t)$ is an exhaust gas temperature measurement at a moment t comprised within the duration of measurements defined by the number n of measurements and their frequency, and $P(Q_{inj}(t))$ is a variable added to the measurement $AT_1(t)$ to weight it in agreement with an oxidation activity of the catalytic converter, or with the exothermic phenomenon of the said catalytic converter; and
   outputting the mean value of exhaust gas temperature measurements to evaluate the efficiency of the catalytic converter.

6. The press in accordance with claims 1, 2 or 3, wherein approximately 20 temperatures measurements are performed, the measurements being carried out at a repetition frequency of 1 Hz.

7. A device for determining the internal temperature of a catalytic converter of a vehicle equipped with a heat engine, comprising a processor, for determining this temperature according to the process in accordance with claims 1, 2 or 3.

* * * * *